May 27, 1969

G. A. DOTTO 3,447,076

ELECTRIC SPEEDOMETER INCLUDING A STEPWISE
ACTUATED PERMANENT-MAGNET MOTOR
Filed March 14, 1966

INVENTOR
GIANNI A. DOTTO
BY
Robert Levine
ATTORNEY

United States Patent Office 3,447,076
Patented May 27, 1969

3,447,076
ELECTRIC SPEEDOMETER INCLUDING A STEP-WISE ACTUATED PERMANENT - MAGNET MOTOR
Gianni A. Dotto, Dayton, Ohio, assignor to P. R. Mallory & Co. Inc., Indianapolis, Ind., a corporation of Delaware
Filed Mar. 14, 1966, Ser. No. 535,650
Int. Cl. G01r 11/02
U.S. Cl. 324—70       3 Claims

ABSTRACT OF THE DISCLOSURE

A rotary switch having contact arms is actuated by a lobed cam driven by a device whose speed is to be measured or controlled. A source of power is coupled through the rotary switch to stator coils of an electric motor which includes a rotor having a series of permanent-magnet poles, and which may also have a one-way clutch. The motor shaft may then be mechanically coupled to a speed indicating device for measuring or controlling the speed of the device which drives the rotary switch.

---

The present invention relates to speed measuring and controlling devices and more particularly to the means and methods for providing a device for controlling the speed of a direct current motor which may be used in a speed measuring device.

A specific application of the present invention would be as an improved coupling means for a speedometer or tachometer. That is, an improved means for coupling a rotary output means to a readout device.

Present day speedometers utilize a flexible cable for connecting a rotary output of a transmission to a readout device. A typical readout device has a rotating magnet which causes a pointer to move in opposition to a calibrated spring, thereby indicating the rotational speed of the magnet. Obviously, speedometers have to be calibrated in miles per hour, feet per second, etc.

One problem with a speedometer, such as described above, is that the flexible cables are subject to wear and may become noisy and fail. Cold weather is especially hard on flexible cables used in automobile speedometers. In cold weather, the lubrication dries and the cables wear excessively.

Another problem with speedometers using flexible cables is that the cables cannot be bent sharply to conform to the shape of the equipment. The sharper the bends in a flexible cable, the more likely it is to wear out.

Another problem with speedometers using flexible cables is that vibration of the equipment tends to cause the speedometer to provide false readings.

In automotive applications, a rear engine automobile or bus presents a problem for speedometers using flexible cables in that the cables must be longer than for a front engine automobile or bus. Some rear engine buses may require a very expensive speedometer cable 30 feet long. It is obvious that a longer cable will provide excessive drag and will wear out sooner than shorter cables. Also, the tendency of a longer cable to wind up will give false speed indications when the driving force is eliminated.

Accordingly, there is presented in this specification an improved means ofr controlling the speed of a direct current motor which may be used as an improved means for connecting a readout device, such as previously described, to a rotary output means. The coupling means of the present invention can be connected to readout devices and transmissions of present day automobiles with little or no modifications. Thus, the coupling means of the present invention is an ideal modification kit for automobiles already in use as well as an ideal coupling means for newly manufactured automobiles.

The coupling means of the present invention is characterized by a rotary switch which is driven by a rotary output means and a direct current motor which rotates at a speed determined by the rotation of the rotary switch. The direct current motor output shaft can be coupled directly to the rotating magnet of a readout device.

In the illustrative embodiment of this specification, the rotary switch has a driven cam with three lobes equally spaced about the circumference. There are two contact members spaced 180 degrees apart in the housing of the rotary switch. As the cam is driven by the rotary output means, the lobes actuate the contact members. Since the lobes are 120 degrees apart, and the contact members are 180 degrees apart, only one contact member will be actuated at a time. Also, each contact member will be actuated three times for each revolution of the cam. The contact members are directly connected to ground and are connected to a terminal member on the rotary switch when actuated by a lobe on the cam. The direct current motor has a bifilar wound, center tapped stator coil with a positive voltage source connected to the center tap. The two end taps of the coil are connected to the two terminal members of the rotary switch. Therefore, current can flow through whichever side of the coil is connected to ground through the rotary switch terminal members and contact members. Obviously, the center tap of the coil could be connected to a negative side of a direct current power source and the contact members could be connected directly to a positive side of said power source in order to have current flow through the coil. In this manner, the rotation of the rotary switch changes the magnetic field of the coil. The rotor of the direct current motor is a permanent magnet rotor having a plurality of well defined north and south pole pairs. As the magnetic field of the coil is changed, the magnetic field of the rotor will line up with the magnetic field of the coil and there will be rotation of the rotor.

The speed control means of the present invention can readily be used in instrumentation applications where the speed of several direct current motors is to be controlled by a single rotary output means. All that is required is one rotary switch, as previously described, which is mechanically coupled to a rotary output means, and several direct current motors of the type having a permanent magnet rotor and a stator for establishing a changing magnetic field for rotating said rotor.

The present invention eliminates the requirement for a flexible cable connection between a rotary output means on a transmission to a readout device. Two electrically conducting wires are the only connection required for the speed measuring device of the present invention.

Other features of the present invention will become apparent as this specification progresses.

It is an object of the present invention, therefore, to provide a means for controlling the speed of a direct current motor.

It is another object of the present invention to provide a coupling means for a speedometer or tachometer, said coupling means being connected between a rotary output means and a readout device.

It is a further object of the present invention to provide a rotary switch means for controlling the speed of a direct current motor of the type having a permanent magnet rotor and a center tapped stator coil.

It is still another object of the present invention to provide a coupling means for a speedometer which can readily be connected between the transmission and readout device on automobiles that have already been manufactured.

It is yet another object of the present invention to provide a speedometer which does not require a flexible cable for coupling the rotary output of a transmission to a readout device.

The present invention, in another of its aspects, relates to novel features of the instrumentalities described herein or teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers decribe elements of similar function therein and wherein the scope of the invention is determined rather from the dependent claims.

For illustrative purposes, the invention will be described in conjunction with the accompanying drawings in which.

Generally speaking, the present invention is a means for controlling the speed of a direct current motor of the type having a permanent magnet rotor and a stator for establishing a changing magnetic field for rotating said rotor, said controlling means comprising: means for connecting said stator to a positive side of a direct current power source; a rotary switch having at least two terminal members and a driven means for alternately connecting said terminal members to a negative side of said power source; and means for connecting said terminal members to said stator so as to establish said changing magnetic field for rotating said rotor.

In a specific application, the present invention is a means for measuring the rotational speed of a rotating member comprising: a readout device of the type having an input shaft and an indicating means calibrated to determine the rotational speed of said input shaft; a direct current motor of the type having a permanent magnet rotor and a stator for establishing a changing magnetic field for rotating said rotor; means for coupling an output shaft of said direct current motor to said input shaft of said readout device; means for connecting said stator to a positive side of a direct current power source; a rotary switch having at least two terminal members and a driven means for alternately connecting said terminal members to a negative side of said power source; means for connecting said terminal members to said stator so as to establish said changing magnetic field for rotating said rotor; and means for connecting said driven means of said rotary switch to said rotary member.

Figure 1:
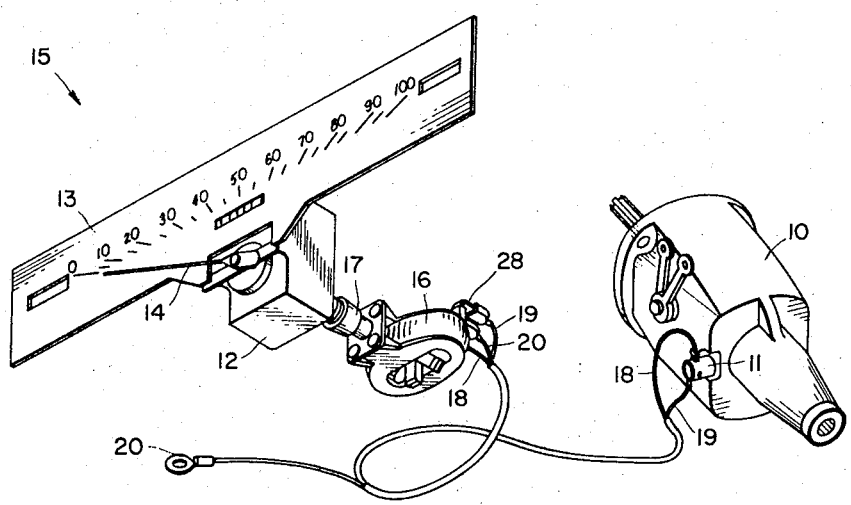
FIGURE 1 is a perspective view of a speedometer and a transmission illustrating how the rotary output of the transmission is connected to the readout device.

Referring now to the drawing, and particularly to FIGURE 1, the components of the present invention can be visualized in conjunction with the following description.

The automobile transmission 10 is illustrated as an example of any equipment which has a rotary output means. The rotary switch 11 of the present invention is coupled to the transmission 10 so as to be driven at a speed determined by the transmission 10. A typical speedometer 15 with a calibrated scale plate 13 and a pointer 14 are illustrated as an example of a readout device which may be used with the present invention.

A direct current motor 16 is connected to the speedometer 15 by means of the coupling 17. The rotor shaft of the direct current motor 16 is coupled to a rotatable magnet which is contained in the box 12.

Two electrical wires 18 and 19 are connected from terminal members on the rotary switch 11 to the end taps of the coil of the direct current motor 16. A third wire 20 is connected from the center tap on the coil of the direct current motor 16 to a positive voltage source.

Figures 2, 3:
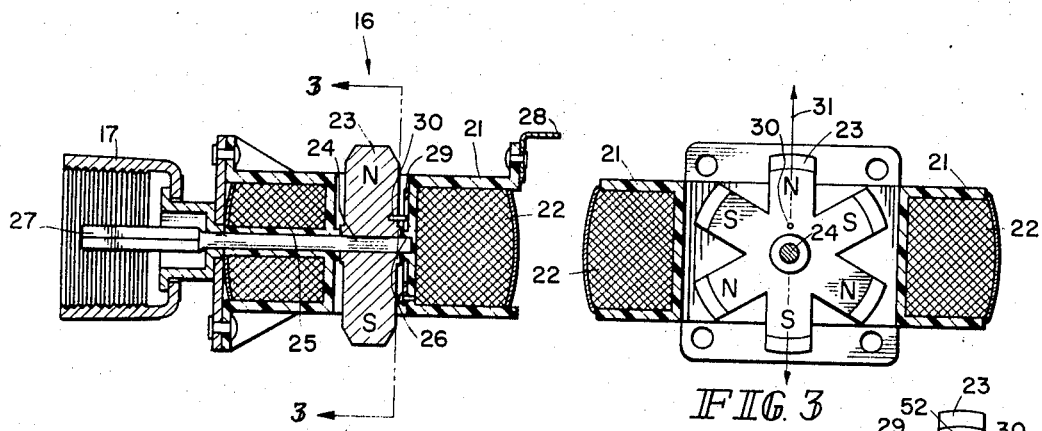
FIGURE 2 is a sectional view of the direct current motor illustrating the arrangement of the coil, permanent magnet rotor, and output shaft.
FIGURE 3 is a sectional view 3—3 taken from FIGURE 2 showing the relationship of the north and south pole pairs of the rotor to the magnetic field of the coil.

Referring now to FIGURE 2, a view showing the arrangement of the coil and the rotor of the direct current motor 16 can be discussed.

The direct current motor 16 has a frame 21 which can be fabricated of any suitable insulating material. The coil 22 of the direct current motor 16 is wound about the frame 21. It has been found that a bifilar wound, center tapped coil will perform satisfactorily in the illustrative embodiment of this specification. The center tap for the coil 22 is connected to a positive voltage source. The end taps of the coil 22 are connected to terminal members on the rotary switch 11.

The rotor 23 of the direct current motor 16 is fixably mounted on the shaft 24 so as to impart rotation thereto. The shaft 24 is rotatably supported in the frame 21 in the axially aligned bores 25 and 26. There is a square male coupling 27 formed on the shaft 24 for engaging a square female coupling in the speedometer 15.

A terminal member 28 is shown attached to the insulating frame 21. There are three such terminals on the frame 21 for connecting to the three taps of the coil 22.

There is a one-way clutch 29 affixed to the frame 21. The pin 30 in the rotor 23 engages the one-way clutch 29 to determine the direction of rotation of the rotor 23. A more descriptive view of the clutch 29 will be shown in FIGURE 6.

Referring now to FIGURE 3, the relationship between the north and south pole pairs of the rotor 23 and the magnetic field axis of the coil 22 can be discussed. There are three north and south pole pairs equally spaced about the rotor 23. The magnetic axis of the coil 22 is defined by the broken line 31 running through the physical center axis of the coil 22. When there is current flowing from the center tap of the coil 22 to a first end tap, the magnetic flux of the coil will have a north pole in a first direction along the line 31. When there is current flow from the center tap of the coil 22 to a second end tap, the magnetic flux will have a north pole in a second direction along the line 31. The rotor 23 will always tend to line up with the magnetic field of the coil 22. As the field changes, the rotor 23 will rotate in order to keep up with the field changes.

The number of north and south pole pairs of the rotor 23 can be changed for different applications to obtain different rotational speeds.

Figures 4, 5, 6:
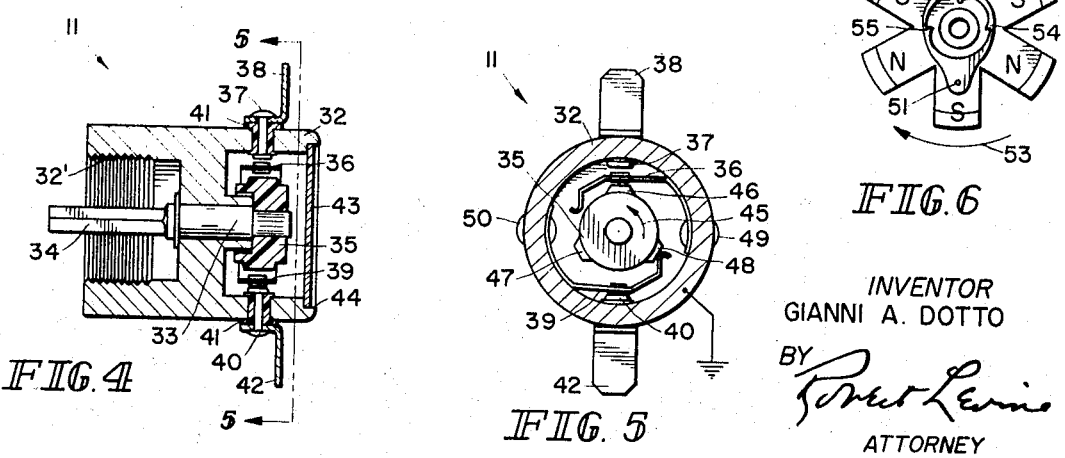
FIGURE 4 is a sectional view of the rotary switch which is driven by a rotary output means.
FIGURE 5 is a sectional view 5—5 taken from FIGURE 4 for illustrating the arragement of the contact members, terminal members, and cam for actuating the contact members.
FIGURE 6 is a view of the rotor of the direct current motor illustrating the operation of an optional one-way clutch.

Referring now to FIGURE 4, a sectional view of the rotary switch 11 can be discussed.

There is a metallic housing 32 which has internal threads 32' for coupling with external threads on the transmission 10. There is a shaft 33 which is rotatably mounted in the center axis of the housing 32. There is a square male coupling 34 formed on the end of the shaft 33.

The cam 35 is mounted on the shaft 33 so as to be rotated thereby. There is a first contact member 36 and a second contact member 39. The first contact member 36 makes contact with the rivet 37 which is in contact with the terminal member 38. The second contact member 39 makes contact with the rivet 40 which is in contact with the terminal member 42. The bushings 41 insulate the rivets 37 and 40 from the metallic housing 32. There is a cover plate 43 fitted into the recess 44 of the housing 32.

Referring now to FIGURE 5, a view showing the arrangement of the cam 35 and the contact members 36 and 39 can be discussed.

The cam 35, which rotates in the direction of the arrow 45, has three lobes 46, 47 and 48 equally spaced about the circumference. The contact members 36 and 39 are spaced 180 degrees apart within the housing 32 and are adapted to be operated by the lobes 46, 47 and 48. Since the contact members 36 and 39 are spaced 180 degrees apart and the lobes 46, 47 and 48 are spaced 120 degrees apart, rotation of the cam 35 will only operate one of the contact members at a time. It can be seen that both the contact members 36 and 39 are connected directly to the metallic housing 32 by means of the rivets 49 and 50 and that the metallic housing 32 is connected to ground.

The terminal member 38 is connected by the wire 18 to one end tap of the coil 22 of the direct current motor 16 and the terminal member 42 is connected by the wire 19 to the opposite end tap of said coil.

As stated previously, the center tap of the coil 22 can be connected to either a positive or negative voltage source, depending on the polarity of the ground connection, and the operation of the invention will not be changed.

Referring now to FIGURE 6, the operation of the optional one-way clutch 29 can be discussed.

The one-way clutch 29 is affixed to the frame 21 of the motor 16 by the rivet 51. (The frame is not shown in FIGURE 6.) The clutch 29 is free to deflect both directions as shown by the arrow 52. When the rotor 23 rotates in the direction of the arrow 53, the pin 30 will ramp over the inclines 54 and 55. If the rotor 23 rotates in a direction opposite to the arrow 53, the pin 30 will be restrained by either the incline 54 or the incline 55.

With the above description of components in mind, and by making reference to the drawing figures, the following analysis of operation will serve to convey the functional details of the present invention.

Referring again to FIGURES 5, it can be seen that as the cam 35 is rotated in the direction of the arrow 45, the lobes 46, 47 and 48 on said cam will alternately operate the contact members 36 and 39 to alternately connect the terminal members 38 and 42 to ground. Since one of the end taps of the coil 22 is connected to the terminal member 38 and the other end tap is connected to the terminal member 42, the two end taps are alternately connected to ground and, consequently, current flows from the center tap of the coil to ground.

Referring now to FIGURE 3, it can be seen that current flow from the center tap of the coil 22 to the first end tap will produce a north magnetic pole in a first direction along the line 31 and current flow from said center tap to the second end tap will produce a north magnetic pole in a second direction along the line 31. The permanent magnet rotor 23 will rotate in order to align the north and south pole pairs on said rotor with the changing magnetic field of the coil 22. Thus, rotation of the cam 35 will cause the rotor 23 to rotate at a speed determined by the speed of said cam and the number of north and south pole pairs of said rotor.

The rotary switch 11 is, therefore, a means for controlling the speed of a direct current motor of the type having a permanent magnet rotor and a stator for establishing a changing magnetic field for rotating said rotor.

In a speedometer or tachometer application, the rotary switch is driven by a rotary output means and the direct current motor output shaft operates a conventional readout device.

What is claimed is:

1. An electric speedometer for a motor vehicle comprising: a D.C. motor having a permanent-magnet rotor adapted for rotation at a speed indicative of motor vehicle speed and a bifilar stator coil having a center tap and two end taps for establishing a changing magnetic field; a one-way clutch coupled to said motor for allowing rotation of said rotor in only one direction; means for connecting said center tap to one side of a D.C. power source; a rotary switch having two terminal members and a cam means for alternately connecting said terminal members to another side of said power source; means for further connecting one of said terminal members to one of said end taps and the other of said terminal members to the other of said end taps so as to establish said changing magnetic field as said cam means is rotated; and speed indicating means coupled to said rotor for displaying the motor vehicle speed.

2. An electric speedometer according to claim 1 wherein said cam means has three lobes equally spaced about the periphery thereof, and wherein said rotary switch is provided with a plurality of movable contact arms connected to said other side of said power source and disposed about said cam means so as to be alternately connected to said terminal members by said lobes as said cam means is rotated.

3. An electric speedometer according to claim 2, wherein said contact arms are displaced about 180 degrees from each other.

References Cited

UNITED STATES PATENTS

| 1,933,086 | 10/1933 | Battegay | 324—70 |
| 2,649,559 | 8/1953 | Wargo | 324—70 |
| 3,187,244 | 6/1965 | Sumerer | 324—70 |
| 3,206,667 | 9/1965 | Haase | 324—70 |
| 3,309,609 | 3/1967 | Brewer | 324—70 |
| 3,335,366 | 8/1967 | Byles | 324—70 |

FOREIGN PATENTS 907,509 10/1962 Great Britain.

RUDOLPH V. ROLINEC, *Primary Examiner.*

M. J. LYNCH, *Assistant Examiner.*